Patented Dec. 15, 1936

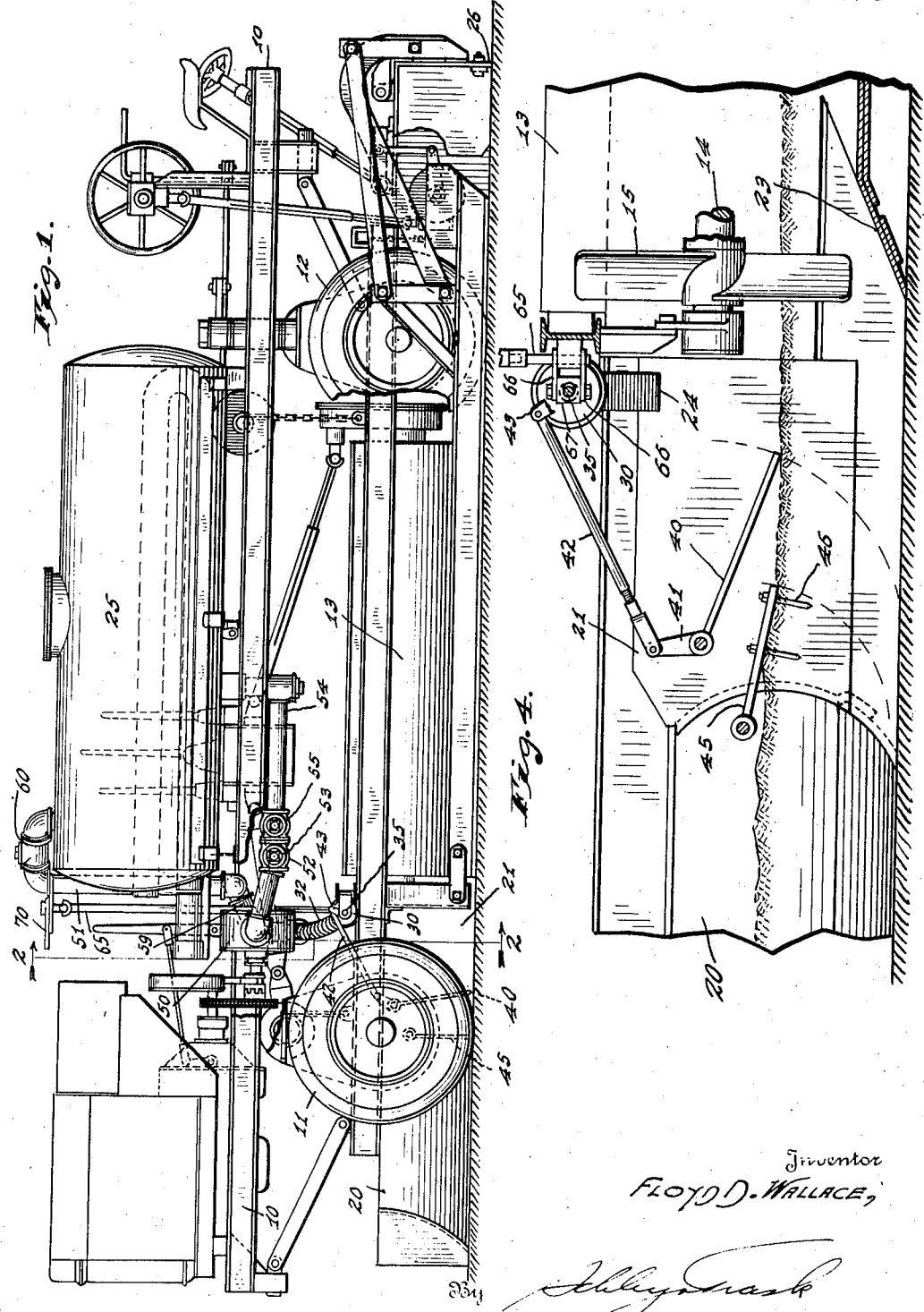

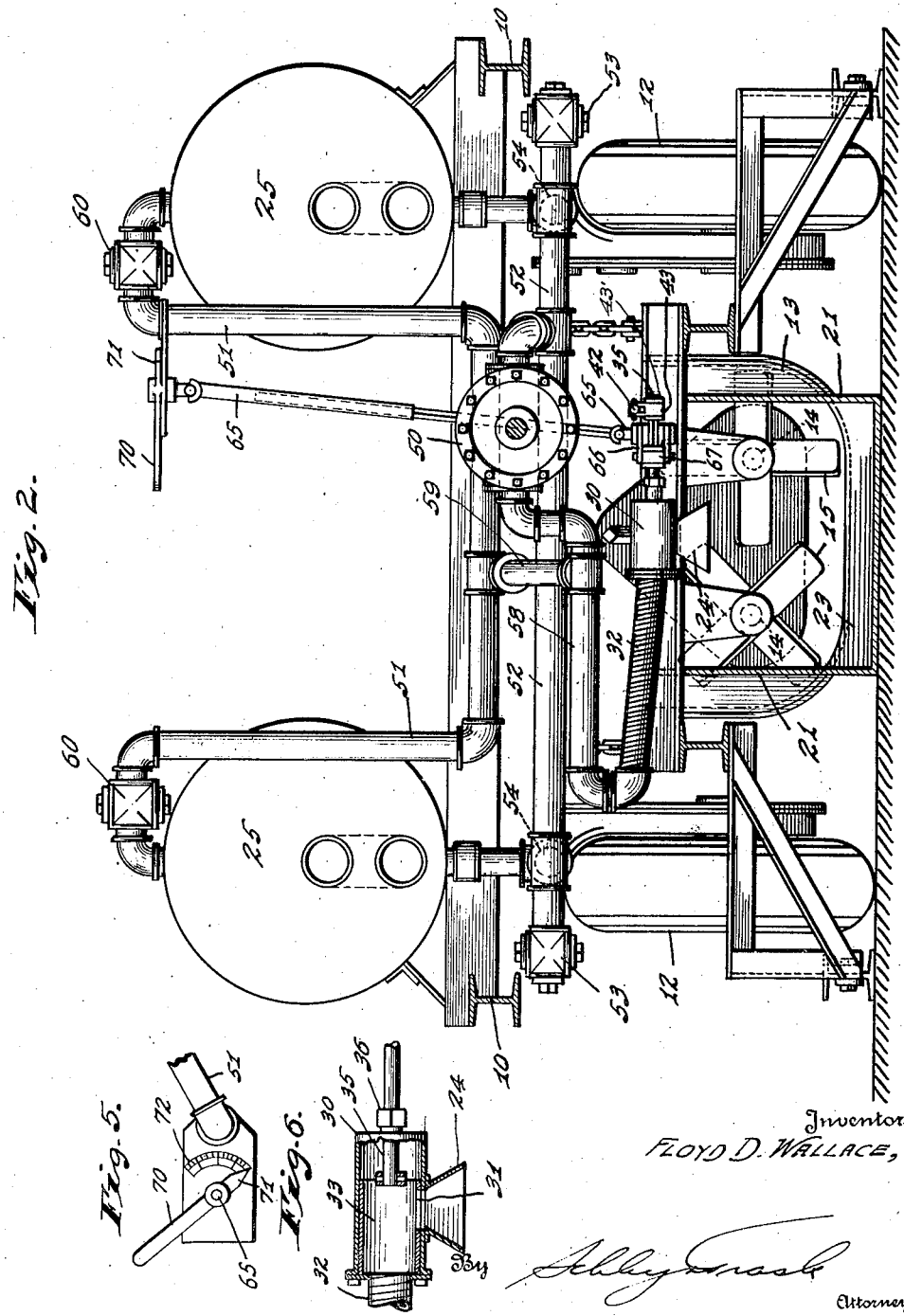

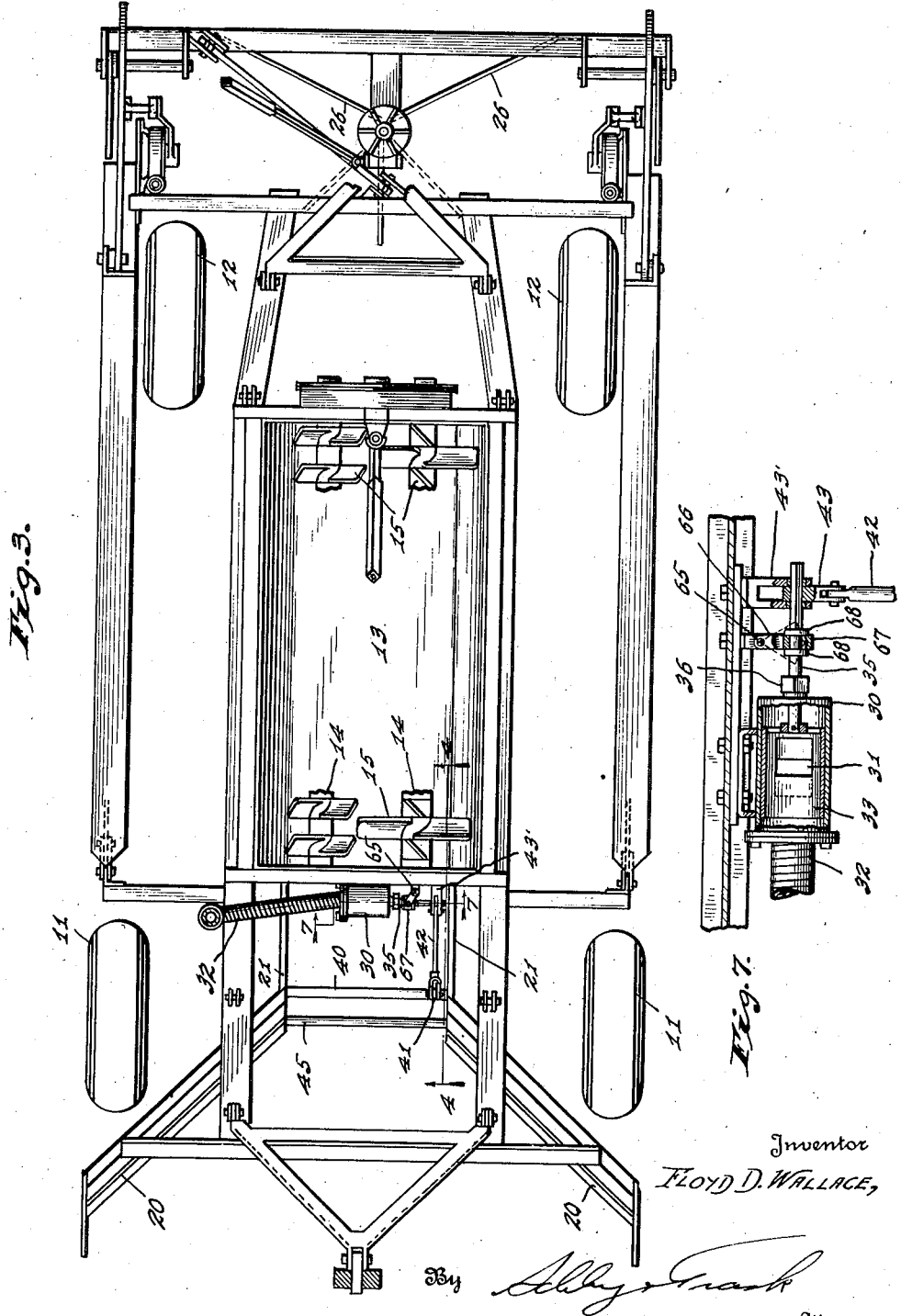

2,064,365

UNITED STATES PATENT OFFICE 2,064,365

RE-TREAD PAVER

Floyd D. Wallace, Indianapolis, Ind., assignor to J. D. Adams Manufacturing Company, Indianapolis, Ind., a corporation of Indiana Application October 5, 1934, Serial No. 746,980

9 Claims. (Cl. 94—43)

My invention relates to paving machines, and more particularly to paving machines which operate on aggregate disposed on the surface of the sub-grade, mix such aggregate with a suitable binder, and then distribute it upon the subgrade to form a pavement surface of the desired configuration. My invention is particularly adapted for inclusion in the paving machine shown and described in the application of William A. Cost and Joseph W. Hartley, Serial No. 752,229, filed November 9, 1934.

It is the object of my invention to maintain automatically the proper relative proportions of aggregate and bitumen in the finished paving composition which the machine produces. More specifically, it is my object to provide mechanism for automatically regulating the amount of binder used in the paving composition in accordance with the amount of aggregate supplied to the machine in order to maintain a predetermined ratio between the amounts of aggregate and binder. A further object of my invention is to provide for the adjustment of such mechanism to vary the predetermined aggregate-binder ratio which is maintained by operation of the device.

In carrying out my invention, the aggregate supplied to the mixing means is caused to pass through a channel of predetermined cross-section; and means responsive to the depth of the aggregate in this channel are utilized for the purpose of regulating the amount of binder supplied to the aggregate. The regulation of the binder is secured by means of an adjustable valve, the position of which is controlled in accordance with the depth of the aggregate in the aforesaid channel. In addition, means are provided for controlling the rate of binder-discharge independently of the amount of aggregate passing through the channel in order to set the device to maintain any desired proportions of binder and bitumen in the finished paving composition.

The accompanying drawings illustrate an embodiment of my invention: Fig. 1 is a side elevation of a complete mixing machine; Fig. 2 is a transverse vertical section through the machine approximately on the line 2—2 of Fig. 1; Fig. 3 is a plan-view of the mixer proper and related parts; Fig. 4 is a fragmental vertical longitudinal section on the line 4—4 of Fig. 3; Fig. 5 is a plan view of the manually operated control for the valve which regulates discharge of binder; Fig. 6 is a vertical axial section through the binder-control valve; and Fig. 7 is a sectional plan view on the line 7—7 of Fig. 3.

The device shown in Fig. 1, which is more fully set forth and described in the co-pending Cost and Hartley application above referred to, is an automotive vehicle having a frame 10 supported by a pair of front wheels 11 and a pair of rear wheels 12. Mounted beneath the frame 10 is the trough 13 of a pug-mill mixer within which are disposed two longitudinally extending shafts 14 each of which carries a plurality of mixing blades 15 in the well-known fashion of pug-mills, such shafts being arranged to be driven in any convenient way from the engine of the vehicle.

In front of the trough 13 of the pug-mill are disposed two rearwardly and inwardly inclined aggregate-gathering blades 20 having their rear ends spaced apart to permit the passage between them of the aggregate upon which the pug-mill is to operate. Extending rearwardly from the rear ends of the blades 20 are a pair of vertically disposed plates 21 between which, near their rear ends, there is a sloping apron 23 which leads upwardly and rearwardly from the surface of the ground to the bottom of the pug-mill trough 13.

The machine described is intended to be driven along a road sub-grade over a windrow of aggregate, such aggregate being gathered by the gathering blades 20, confined laterally by the plates 21, and elevated and discharged into the pug-mill by the inclined apron 23. As it enters the pug-mill, the aggregate is sprayed with liquid binder discharged from a nozzle 24. The discharge nozzle 24 is supplied with the binder from tanks 25 carried on the frame 10 of the machine. The aggregate and binder pass rearwardly through the pug-mill 13 and are discharged at the rear end thereof in front of a distributing blade 26 which is adjustable in a vertical plane to distribute the paving composition to the desired cross-section upon the sub-grade.

In describing, by way of example, a machine suitable for the incorporation of my invention, I refer only to such details as are necessary to a complete understanding. For further details of a suitable machine, reference is made to the aforesaid co-pending Cost and Hartley application.

In embodying my invention in a mixing machine, whether that machine is of the particular type illustrated and described or of some other type, I provide a valve for regulating the discharge of binder from the nozzle 24, and I control this valve, at least in part, by means responsive to the amount of aggregate entering the pug-mill. Further, I provide means for subjecting the liquid binder discharged from the nozzle 24 to a constant discharge head, and thus insure that the amount of binder supplied to the aggregate will be proportional to the amount of aggregate.

In the broader aspects of my invention, the valve employed to control the rate of binder-discharge from the nozzle 24 may take any desired form, but I prefer to employ a valve such as that illustrated in Fig. 6. The valve there shown comprises a cylindrical casing 30 having a discharge port 31 communicating with the discharge nozzle 24 and an axial inlet port connected with a binder-supply pipe 32. Within the casing 30 is mounted a rotatable, hollow valving element 33 open at one end to receive binder from the pipe 32 and having a laterally directed discharge port communicating with the port 31 in the casing 30. The valving element 33 is secured to a rotatable shaft 35 which extends axially from the casing through a suitable stuffing box 36. By rotating the shaft 35, the relative position of the discharge ports in the valve element and casing 30 may be controlled to regulate the discharge of binder through the nozzle 24.

The means responsive to the amount of aggregate fed into the pug-mill preferably takes the form of a swinging vane 40 pivotally mounted on a horizontal axis between the plates 21 and adapted to rest, under the influence of gravity, upon the upper surface of the body of aggregate passing rearwardly between those plates. Rigid with the swinging vane 40 is an arm 41 connected by a link 42 to an arm 43 which is rotatable with the valve shaft 35. It will be apparent that as the vane 40 swings vertically in accordance with the amount of aggregate passing between the plates 21 the shaft 35 will be moved to rotate the movable valving element 33, and that such valving element, in turn, will control the rate at which the binder is discharged from the nozzle 24. By this arrangement it is possible automatically to maintain constant proportions of aggregate and binder even though the quantity of aggregate passing through the machine varies.

To level the upper surface of the aggregate passing rearwardly between the two plates 21 and thereby to insure that the position of the vane 40 will be accurately responsive to the amount of aggregate, it is advisable to dispose in advance of the vane 40 some means for leveling the aggregate. Conveniently, this means takes the form of a swinging vane 45 which rests on the upper surface of the aggregate and is held in contact therewith by the force of gravity. The leveling action of the vane 45 may be aided by providing near its free edge a series of rake teeth 46 which project forwardly and downwardly from the vane 45 into the aggregate passing beneath it.

For the purpose of maintaining a constant discharge head upon the nozzle 24, the binder in the tanks 25 is continuously circulated by a pump 50 which discharges through pipes 51 leading to the tops of the tanks 25, and the pipe 32, which supplies the binder to the discharge through the nozzle 24, is connected to the pipes 51.

The preferred piping arrangement embodies a transversely extending pipe 52 having at its ends valved fittings 53 adapted for connection to an outside source of binder supply. Near each end the pipe 52 has a branch 54 leading to the lowermost point of the adjacent tank 25, each of such branches containing a valve 55. The pipe 52 is connected to the inlet of the pump 50, while the discharge of the pump is connected through a pipe 58 with the pipe 32 which supplies the binder to the valve casing 30 and therethrough to the nozzle 24. The pipes 51 and 58 intercommunicate through a cross-connection 59, so that part of the binder discharged from the pump is supplied to the nozzle 24 and part to the pipes 51. The pipes 51 are provided with valves 60 at least one of which will be open when the machine is operating; and, as a result, the binder emerging from the nozzle 24 will be subjected to a substantially constant discharge head.

It is obvious from the above description of the piping arrangement that by suitable adjustment of the valves either or both of the tanks 25 can be filled with binder from an exterior source supplied through the valved fittings 53 and that binder can be withdrawn from either or both of the tanks 25 and discharged through the binder-discharge nozzle 24. When the binder is being withdrawn from only one of the tanks the valves 55 and 60 associated with that tank are opened, while the valves 55 and 60 associated with the other tank are closed. If the binder is to be withdrawn simultaneously from both tanks, both sets of valves 55 and 60 are open.

When the binder is being withdrawn from either or both of the tanks 25, the pump 50 discharges against a substantially constant head—that represented by the vertical distance between the pump 50 and the point at which the pipe 51 discharges into the tanks 25. Since the pipes 51 and the pipe supplying the discharge nozzle 24 intercommunicate through the connection 59, the pressure-head causing discharge from the nozzle 24 remains substantially constant irrespective of any variations in the level of the binder in the tanks 25.

The proportions of aggregate and binder which, in the operation of the device, are maintained constant by the interconnection of the valving element 30 and the swinging vane 40 may be varied from time to time to meet various conditions or to comply with different sets of specifications. To secure the desired proportions of aggregate and binder, I may employ means operated independently of the position of the vane 40 for modifying the rate at which the binder is discharged from the nozzle 24. This means may take various forms, but I prefer to embody it in the valve illustrated in Fig. 6, the valving element of which is not only rotatable, as previously described, but also axially movable to produce varying degrees of axial misalinement of the discharge ports in the valving element and casing 30. To this end, the shaft 35 is axially slidable in the stuffing box 36 and has a sliding connection with the arm 43 which controls its angular position, such arm being held in fixed position axially of itself by a bracket 43' in which it is rotatably mounted. The axial position of the valving element 33 and the shaft 35 with which it is rigid is controlled by a vertical rock-shaft 65 having a pair of laterally projecting arms 66 which engage a yoke 67 disposed between two collars 68 held in fixed axial position on the shaft 35. The shaft 65 is operatively connected to a swinging control member 70 pivotally mounted at some convenient point on the machine and preferably carrying a pointer 71 which cooperates with a fixed graduated scale 72.

In the position shown in Fig. 6, the valving element 33 is at the leftward limit of its axial movement, and the discharge ports of the valving element and the casing 30 are in alinement. Any movement of the valving element 33 to the right, therefore, will cut down the effective area of the discharge ports and reduce the rate of binder-discharge.

The axial position of the movable valving element is controlled by the control member 70, the scale 72 being calibrated so that, by reference to the position of the pointer along the scale, the operator may set the device to secure any desired proportions of aggregate and binder in the paving composition. When the valve 33 has once been set, the proportions of aggregate and binder are maintained constant independently of the amount of aggregate entering the pug-mill; for, should the amount of aggregate entering the pug-mill increase, the vane 40 will swing upwardly and rotate the valve 33 to effect a corresponding increase in the rate of binder-discharge from the nozzle 24, and vice versa.

I claim as my invention:—

1. In combination with a mixer, means for guiding aggregate into said mixer, means for supplying a liquid binder to said mixer, a device for controlling the rate of binder supply, and means responsive to the amount of aggregate entering said mixer and operatively connected to said controlling device to vary the rate of binder discharge in accordance with the rate at which aggregate enters the mixer.

2. In combination with a mixer, a channel for guiding aggregate into said mixer, means for supplying a liquid binder to said mixer, a device for controlling the rate of binder supply, and means responsive to the depth of aggregate in said channel and operatively connected to said controlling device to vary the rate of binder discharge in accordance with the rate at which aggregate enters the mixer.

3. In combination with a mixer, a channel for guiding aggregate into said mixer, means for supplying a liquid binder to said mixer, a device for controlling the rate of binder supply, and means responsive to a pivoted vane positioned to rest upon the upper surface of aggregate in said channel and operatively connected to said controlling device to vary the rate of binder discharge in accordance with the rate at which aggregate enters the mixer.

4. The invention set forth in claim 3 with the addition of aggregate-leveling means disposed in said channel in advance of said vane.

5. The invention set forth in claim 1 with the addition of a second device for controlling the rate of binder-supply, said second device being operable independently of the means responsive to the amount of aggregate entering the mixer.

6. In combination with a mixer, means for guiding aggregate into said mixer, a conduit for conveying liquid binder to said mixer, means for supplying liquid binder under constant head to said conduit, a valve in said conduit for controlling the rate at which binder is supplied to said mixer, and means responsive to the amount of aggregate entering said mixer and operatively connected to said valve to vary the rate of binder discharge in accordance with the rate at which aggregate enters the mixer.

7. In combination with a mixer, means for guiding aggregate into said mixer, a conduit for conveying liquid binder to said mixer, a valve in said conduit, said valve having a movable valve member movable along either of two different paths of movement to control the rate of binder supply to said mixer, and mechanism responsive to the amount of aggregate entering said mixer for moving said valve member along one of its paths of movement.

8. In combination with a mixer, means for guiding aggregate into said mixer, a conduit for conveying liquid binder to said mixer, a valve in said conduit, said valve comprising a ported cylindrical casing and a ported valve member rotatable and axially slidable therein, mechanism responsive to the amount of aggregate entering said mixer for rotating said valve member, and means for adjusting said valve member axially.

9. In combination with a mixer, means for guiding aggregate into said mixer, a tank adapted to contain a supply of liquid binder, a pump for withdrawing binder from said tank, a pipe for receiving binder from said pump, said pipe discharging into said tank above the binder-level therein and above the mixer, a conduit connected to said pipe between its point of discharge and said pump for conveying to said mixer part of the binder discharged from the pump, a valve in said conduit, and means responsive to the amount of aggregate entering said mixer for controlling said valve.

FLOYD D. WALLACE.